Figure 4:
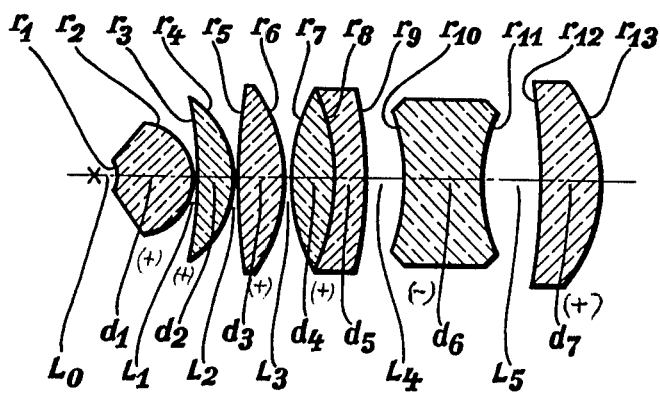

July 7, 1953     G. RAVIZZA ET AL     2,644,362
MICROSCOPE OBJECTIVE

Filed July 5, 1951     2 Sheets-Sheet 1

Gottfried Ravizza
Karl Keiner
Walter Klein
INVENTORS

BY

James E. A. Kingsbury
atty

July 7, 1953  G. RAVIZZA ET AL  2,644,362
MICROSCOPE OBJECTIVE

Filed July 5, 1951  2 Sheets-Sheet 2

Gottfried Ravizza
Karl Reiner
Walter Klein
INVENTORS

BY
Jom E. C. Knigsbey
Atty.

Patented July 7, 1953

2,644,362

UNITED STATES PATENT OFFICE 2,644,362

MICROSCOPE OBJECTIVE

Gottfried Ravizza, Wetzlar, Karl Keiner, Berghausen, and Walter Klein, Dutenhofen, Germany, assignors to Ernst Leitz, G. m. b. H., a corporation of Germany Application July 5, 1951, Serial No. 235,132
In Germany July 26, 1950

6 Claims. (Cl. 88—57)

This invention relates to improvements in microscope objectives. Most microscope objectives have a considerable curvature of the image field and the compensating effect of the ocular is utilized to overcome this defect. However, the problem of leveling the image field by itself is an important problem and many attempts have been made to solve it. One arrangement in particular has become known, namely the leveling of the image field curvature by the use of so called thick menisci. A thick meniscus is a lens having a dispersing surface which is more strongly curved than its converging surface and the thickness of the lens is greater than one half the radius of the dispersing surface. It has a relatively great negative or also positive focal length according to its thickness. Sometimes a meniscus may consist of cemented single lenses. It is also known that such a meniscus has a Petzval sum which is zero or less than zero. When the meniscus is used as a front lens it is subject to considerable astigmatism.

The British Patent 506,321, May 25, 1939, or U. S. Patent 2,206,155, dated July 2, 1940, discloses an objective in which the astigmatism of a thick meniscus which is curved toward the object and serves as a front lens is eliminated by means of a second thick meniscus which is the last lens element toward the ocular side and which is convex toward the object. The second thick meniscus therefore increases the negative value of the Petzval sum.

The manufacture of a thick meniscus is difficult because of its strong curvatures and the object of this invention is therefore to provide for correction for astigmatism and at the same time avoid the use of the second thick meniscus.

The invention is embodied in a microscope objective in which a thick meniscus serves as the front lens and is corrected for astigmatism by being followed, first, by a dispersing cemented surface within a converging lens member, the center of curvature of the cemented surface being on the object side, and, second, by a negative lens arranged on the image side thereof.

Such a combination of lens elements arranged in accordance with the invention provides a steady opposing effect against astigmatism of the thick meniscus and serves also to eliminate other faults of the image by means of further converging lenses of known types.

The accompanying drawings Figs. 1 through 5 illustrate in axial sections calculated examples containing the date set forth in the tables of values appearing hereinafter in the description of each of the figures in the drawings and also included in the claims which are to be read accordingly. In these tables the radii of curvatures, the lens-thicknesses, the axial distances between lens elements and other dimensional and optical details are enumerated and identified as follows, namely that $f_e$=the focal length for the $e$-line,
$A$=the aperture,
$P$=the Seidel coefficient for the Petzval sum,
$\Gamma$=the Seidel coefficient for the astigmatism,
$B_e$=the magnification for the $e$-line,
$r$=radius,
$L_0$=distance of the object,
$L_b$=distance between the last lens and the image,
$L$=distance between two lenses,
$d$=thickness of lens,
$n_d$=refractive index and Abbe number,
$d_0$=thickness of cover glass.

The examples set forth in the descriptions of the several figures in the drawing as hereinafter set forth, show that the correction means provided in accordance with the invention result in objectives in which the image field curvature is satisfactorily leveled with very little astigmatism. Fine correction which may be required later on does not materially affect the advantages of the invention.

Fig. 1 illustrates a lens system according to the invention in which the several lens elements shown in the drawing are characterized by the following values:

| | | |
|---|---|---|
| $r_1=-4.0$ | $d_1=11.25$ | $n_d=1.6727/32.2$ |
| $r_2=-7.6$ | $L_1=0.3$ | |
| $r_3=+20.14$ | $d_2=2.0$ | 1.3921/99.8 |
| $r_4=-7.0$ | $d_3=1.0$ | 1.7015/41.1 |
| $r_5=-35.35$ | $L_2=17.5$ | |
| $r_6=+22.0$ | $d_4=2.2$ | 1.4875/70.0 |
| $r_7=-19.92$ | $L_3=4.75$ | |
| $r_8=+17.77$ | $d_5=1.5$ | 1.7283/28.3 |
| $r_9=+10.0$ | | |
| | $L_0=2.1453$ distance to object $L_b=\infty$ distance to image. | |
| $f_e=+15.9530$ | $A=0.25$  $\Sigma P=-0.028$ | $\Sigma\Gamma=-0.011$ |

Fig. 2 illustrates a lens system according to the invention in which the several lens elements shown in the drawing are characterized by the following values:

| | | |
|---|---|---|
| $r_1 = -2.2$ | $L_0 = 0.92378$ | |
| $r_2 = -4.06$ | $d_1 = 5.6$ | $n_d = 1.6228/56.9$ |
| $r_3 = -150.0$ | $L_1 = 0.3$ | |
| $r_4 = -7.8$ | $d_2 = 1.2$ | $1.4339/95.2$ |
| $r_5 = +18.1$ | $L_2 = 0.3$ | |
| $r_6 = -6.98$ | $d_3 = 2.0$ | $1.4339/95.2$ |
| $r_7 = -80.0$ | $d_4 = 1.0$ | $1.7283/28.3$ |
| $r_8 = +32.43$ | $L_3 = 20.5$ | |
| $r_9 = -32.43$ | $d_5 = 2.0$ | $1.6228/56.9$ |
| $r_{10} = +17.0$ | $L_4 = 8.5$ | |
| $r_{11} = +10.0$ | $d_6 = 1.5$ | $1.6261/39.1$ |
| | $L_5 = \infty$ | |

| $f_e = +7.9758$ | $A = 0.50$ | $\Sigma P = -0.031$ | $\Sigma \Gamma = -0.011$ |
|---|---|---|---|

Fig. 3 illustrates a lens system according to the invention in which the several lens elements shown in the drawing are characterized by the following values:

| | | |
|---|---|---|
| | $d_0 = 0.17$ | $n_d = 1.5228/58.5$ |
| | $L_0 = 0.65518$ | |
| $r_1 = -1.4$ | | |
| $r_2 = -2.42$ | $d_1 = 3.15$ | $1.6228/56.9$ |
| $r_3 = -50.0$ | $L_1 = 0.4$ | |
| $r_4 = -4.275$ | $d_2 = 1.13$ | $1.4339/95.2$ |
| $r_5 = +7.35$ | $L_2 = 0.3$ | |
| $r_6 = -3.83$ | $d_3 = 2.15$ | $1.4339/95.2$ |
| $r_7 = -30.37$ | $d_4 = 1.0$ | $1.7276/28.4$ |
| $r_8 = +36.05$ | $L_3 = 21.0$ | |
| $r_9 = -36.05$ | $d_5 2.0$ | $1.6228/56.9$ |
| $r_{10} = +12.0$ | $L_4 = 9.0$ | |
| $r_{11} = +8.02$ | $d_6 1.5$ | $1.6700/47.2$ |
| | $L_5 = 155.0$ | |

| $\beta_e = -39.8455$ | $f_e = +4.4198$ | $A = 0.65$ | $\Sigma P = -0.023$ | $\Sigma \Gamma = +0.007$ |
|---|---|---|---|---|

Fig. 4 illustrates a lens system according to the invention in which the several lens elements shown in the drawing are characterized by the following values:

| | | |
|---|---|---|
| $r_1 = -1.80$ | $L_0 = 0.37374$ | |
| $r_2 = -3.60$ | $d_1 = 4.80$ | $n_d = 1.62230/53.1$ |
| $r_3 = -24.75$ | $L_1 = 0.10$ | |
| $r_4 = -6.21$ | $d_2 = 2.50$ | $1.39211/99.8$ |
| $r_5 = +39.96$ | $L_2 = 0.10$ | |
| $r_6 = -10.00$ | $d_3 = 3.00$ | $1.39211/99.8$ |
| $r_7 = +12.00$ | $L_3 = 0.20$ | |
| $r_8 = -14.00$ | $d_4 = 3.00$ | $1.39211/99.8$ |
| $r_9 = -26.00$ | $d_5 = 2.00$ | $1.72825/28.3$ |
| $r_{10} = -13.50$ | $L_4 = 2.30$ | |
| $r_{11} = +10.90$ | $d_6 = 5.00$ | $1.67270/32.2$ |
| $r_{12} = -40.27$ | $L_5 = 4.00$ | |
| $r_{13} = -10.56$ | $d_7 = 3.80$ | $1.62280/56.9$ |
| | $L_6 = \infty$ | |

| $f_e = +6.44734$ | $A = 0.70$ | $\Sigma P = -0.0479$ | $\Sigma \Gamma = +0.0134$ |
|---|---|---|---|

Figure 5:
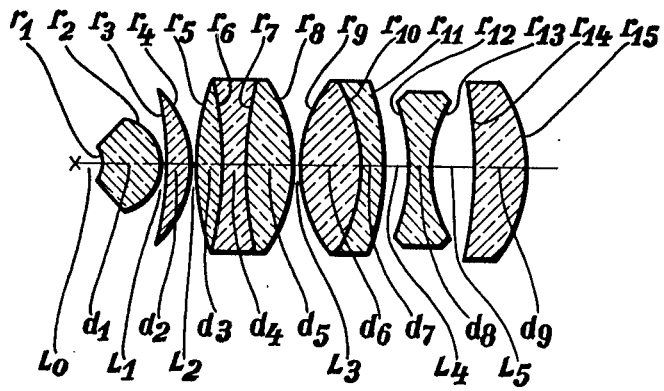

Fig. 5 illustrates a lens system according to the invention in which the several lens elements shown in the drawing are characterized by the following values:

| | | |
|---|---|---|
| $r_1 = -1.15$ | $L_0 = 0.3104$ | |
| $r_2 = -1.88$ | $d_1 = 2.38$ | $n_d = 1.60738/56.7$ |
| $r_3 = -12.50$ | $L_1 = 0.05$ | |
| $r_4 = -4.00$ | $d_2 = 1.00$ | $1.60565/37.9$ |
| $r_5 = +9.896$ | $L_2 = 0.05$ | |
| $r_6 = -14.14$ | $d_3 = 1.20$ | $1.39211/99.8$ |
| $r_7 = +14.14$ | $d_4 = 0.80$ | $1.72825/28.3$ |
| $r_8 = -5.45$ | $d_5 = 2.00$ | $1.39211/99.8$ |
| $r_9 = +5.35$ | $L_3 = 0.10$ | |
| $r_{10} = -6.40$ | $d_6 = 2.40$ | $1.39211/99.8$ |
| $r_{11} = -9.66$ | $d_7 = 0.90$ | $1.62364/36.7$ |
| $r_{12} = -6.98$ | $L_4 = 0.90$ | |
| $r_{13} = +5.05$ | $d_8 = 0.90$ | $1.59551/39.2$ |
| $r_{14} = -17.35$ | $L_5 = 1.70$ | |
| $r_{15} = -5.88$ | $d_9 = 2.00$ | $1.62374/47.0$ |
| | $L_6 = \infty$ | |

| $f_e = +3.28904$ | $A = 0.95$ | $\Sigma P = -0.01129$ | $\Sigma \Gamma = -0.03695$ |
|---|---|---|---|

The invention is not limited to the exact values set forth in the foregoing specification or in the appended claims. It is known in this art that changes in a stated value may be made and compensated for by a corresponding change in another related value. I claim therefore all such changes and modifications as come within the principle of the invention and the scope of the appended claims.

We claim:

1. A microscope objective comprising a thick meniscus front lens, a plurality of converging lenses on the image side of said thick meniscus, lens elements for correcting the astigmatism caused by said thick meniscus consisting of a dispersing cemented surface in one of said converging lenses and a single negative lens positioned on the image side of said one converging lens near the rear end of said objective, said cemented surface being concave towards said thick meniscus, the curvature of said cemented surface being such that it receives the oblique principal light rays under a large angle of incidence, said front lens being the only thick meniscus in the said objective.

2. A microscope objective including a thick meniscus positioned as the front lens and having a dispersing cemented surface within a converging lens element and a negative lens on the image side of said surface positioned behind the said meniscus whereby to correct for the astigmatism caused by said thick meniscus, said dispersing cemented surface having the center of its curvature on the object side of said objective, characterized by the following data

| | | |
|---|---|---|
| $r_1 = -4.0$ | $d_1 = 11.25$ | $n_d = 1.6727/32.2$ |
| $r_2 = -7.6$ | $L_1 = 0.3$ | |
| $r_3 = +20.14$ | $d_2 = 2.0$ | $1.3921/99.8$ |
| $r_4 = -7.0$ | $d_3 = 1.0$ | $1.7015/41.1$ |
| $r_5 = -35.35$ | $L_2 = 17.5$ | |
| $r_6 = +22.0$ | $d_4 = 2.2$ | $1.4875/70.0$ |
| $r_7 = -19.92$ | $L_3 = 4.75$ | |
| $r_8 = +17.77$ | $d_5 = 1.5$ | $1.7283/28.3$ |
| $r_9 = +10.9$ | $L_0 = 2.1453$ | |
| | $L_b = \infty$ | |
| $f_e = +15.9530$ | | $\Sigma P = -0.028$ |
| $A = 0.25$ | | $\Sigma \Gamma = -0.011$ | wherein $f_e$=the focal length for the $e$-line,
$A$=the aperture,
$\Sigma P$=the Seidel coefficient for the Petzval sum,
$\Sigma \Gamma$=the Seidel coefficient for astigmatism,
$B_e$=the magnification for the $e$-line,
$r$=radius
$L_0$=distance of the object,
$L_b$=distance to the image,
$L$=distance between two lenses,
$d$=thickness of lens,
$n_d$=refractive index and Abbe number.

3. A microscope objective including a thick meniscus positioned as the front lens and having a dispersing cemented surface within a converging lens element and a negative lens on the image side of said surface positioned behind the said meniscus whereby to correct for the astigmatism caused by said thick meniscus, said dispersing cemented surface having the center of its curvature on the object side of said objective, characterized by the following data

| | | |
|---|---|---|
| $r_1 = -2.2$ | $L_0 = 0.92378$ | |
| $r_2 = -4.06$ | $d_1 = 5.6$ | $n_d = 1.6228/56.9$ |
| $r_3 = -150.0$ | $L_1 = 0.3$ | |
| $r_4 = -7.8$ | $d_2 = 1.2$ | $1.4339/95.2$ |
| $r_5 = +18.1$ | $L_2 = 0.3$ | |
| $r_6 = -6.98$ | $d_3 = 2.0$ | $1.4339/95.2$ |
| $r_7 = -80.0$ | $d_4 = 1.0$ | $1.7283/28.3$ |
| $r_8 = +32.43$ | $L_3 = 20.5$ | |
| $r_9 = -32.43$ | $d_5 = 2.0$ | $1.6228/56.9$ |
| $r_{10} = +17.0$ | $L_4 = 8.5$ | |
| $r_{11} = +10.0$ | $d_6 = 1.5$ | $1.6261/39.1$ |
| | $L_b = \infty$ | |
| $f_e = +7.9758$ | | $\Sigma P = -0.031$ |
| $A = 0.50$ | | $\Sigma \Gamma = -0.011$ | wherein $f_e$=the focal length for the $e$-line,
$A$=the aperture,
$\Sigma P$=the Seidel coefficient for the Petzval sum,
$\Sigma \Gamma$=the Seidel coefficient for astigmatism,
$B_e$=the magnification for the $e$-line,
$r$=radius
$L_0$=distance of the object,
$L_b$=distance to the image,
$L$=distance between two lenses,
$d$=thickness of lens,
$n_d$=refractive index and Abbe number.

4. A microscope objective including a thick meniscus positioned as the front lens and having a dispersing cemented surface within a converging lens element and a negative lens on the image side of said surface positioned behind the said meniscus whereby to correct for the astigmatism caused by said thick meniscus, said dispersing cemented surface having the center of its curvature on the object side of said objective, characterized by the following data

| | | |
|---|---|---|
| | $d_0 = 0.17$ | $n_d = 1.5228/58.5$ |
| $r_1 = -1.4$ | $L_0 = 0.65518$ | |
| $r_2 = -2.42$ | $d_1 = 3.15$ | $1.6228/56.9$ |
| $r_3 = -50.0$ | $L_1 = 0.4$ | |
| $r_4 = -4.275$ | $d_2 = 1.13$ | $1.4339/95.2$ |
| $r_5 = +7.35$ | $L_2 = 0.3$ | |
| $r_6 = -3.83$ | $d_3 = 2.15$ | $1.4339/95.2$ |
| $r_7 = -30.37$ | $d_4 = 1.0$ | $1.7276/28.4$ |
| $r_8 = +36.05$ | $L_3 = 21.0$ | |
| $r_9 = -36.05$ | $d_5 = 2.0$ | $1.6228/56.9$ |
| $r_{10} = +12.0$ | $L_4 = 9.0$ | |
| $r_{11} = +8.02$ | $d_6 = 1.5$ | $1.6700/47.2$ |
| | $L_b = 155.0$ | |
| $B_e = -39.8455$ | | $\Sigma P = -0.023$ |
| $f_e = +4.4198$ | | $\Sigma \Gamma = +0.007$ |
| $A = 0.65$ | | | wherein $f_e$=the focal length for the $e$-line,
$A$=the aperture,
$\Sigma P$=the Seidel coefficient for the Petzval sum,
$\Sigma \Gamma$=the Seidel coefficient for astigmatism,
$B_e$=the magnification for the $e$-line,
$r$=radius
$L_0$=distance of the object,
$L_b$=distance to the image,
$L$=distance between two lenses,
$d$=thickness of lens,
$n_d$=refractive index and Abbe number.

5. A microscope objective including a thick meniscus positioned as the front lens and having a dispersing cemented surface within a converging lens element and a negative lens on the image side of said surface positioned behind the said meniscus whereby to correct for the astigmatism caused by said thick meniscus, said dispersing cemented surface having the center of its curvature on the object side of said objective, characterized by the following data

| | | |
|---|---|---|
| $r_1 = -1.80$ | $L_0 = 0.37374$ | |
| | $d_1 = 4.80$ | $n_d = 1.62230/53.1$ |
| $r_2 = -3.60$ | | |
| | $L_1 = 0.10$ | |
| $r_3 = -24.75$ | | |
| | $d_2 = 2.50$ | $1.39211/99.8$ |
| $r_4 = -6.21$ | | |
| | $L_2 = 0.10$ | |
| $r_5 = +39.96$ | | |
| | $d_3 = 3.00$ | $1.39211/99.8$ |
| $r_6 = -10.00$ | | |
| | $L_3 = 0.20$ | |
| $r_7 = +12.00$ | | |
| | $d_4 = 3.00$ | $1.39211/99.8$ |
| $r_8 = -14.00$ | | |
| | $d_5 = 2.00$ | $1.72825/28.3$ |
| $r_9 = -26.00$ | | |
| | $L_4 = 2.30$ | |
| $r_{10} = -13.50$ | | |
| | $d_6 = 5.00$ | $1.67270/32.2$ |
| $r_{11} = +10.90$ | | |
| | $L_5 = 4.00$ | |
| $r_{12} = -40.27$ | | |
| | $d_7 = 3.80$ | $1.62280/56.9$ |
| $r_{13} = -10.56$ | | |
| | $L_6 = \infty$ | |
| $f_e = +6.44734$ | | $\Sigma P = -0.0479$ |
| $A = 0.70$ | | $\Sigma \Gamma = +0.0134$ | wherein $f_e$=the focal length for the $e$-line,
$A$=the aperture,
$\Sigma P$=the Seidel coefficient for the Petzval sum,
$\Sigma \Gamma$=the Seidel coefficient for astigmatism,
$B_e$=the magnification for the $e$-line,
$r$=radius
$L_0$=distance of the object,
$L_b$=distance to the image,
$L$=distance between two lenses,
$d$=thickness of lens,
$n_d$=refractive index and Abbe number.

6. A microscope objective including a thick meniscus positioned as the front lens and having a dispersing cemented surface within a converging lens element and a negative lens on the image side of said surface positioned behind the said meniscus whereby to correct for the astigmatism caused by said thick meniscus, said dispersing cemented surface having the center of its curvature on the object side of said objective, characterized by the following data

| | | |
|---|---|---|
| $r_1 = -1.15$ | $L_0 = 0.3104$ | |
| | $d_1 = 2.38$ | $n_d = 1.60738/56.7$ |
| $r_2 = -1.88$ | | |
| | $L_1 = 0.05$ | |
| $r_3 = -12.50$ | | |
| | $d_2 = 1.00$ | $1.60565/37.9$ |
| $r_4 = -4.00$ | | |
| | $L_2 = 0.05$ | |
| $r_5 = +9.896$ | | |
| | $d_3 = 1.20$ | $1.39211/99.8$ |
| $r_6 = -14.14$ | | |
| | $d_4 = 0.80$ | $1.72825/28.3$ |
| $r_7 = +14.14$ | | |
| | $d_5 = 2.00$ | $1.39211/99.8$ |
| $r_8 = -5.45$ | | |
| | $L_3 = 0.10$ | |
| $r_9 = +5.35$ | | |
| | $d_6 = 2.40$ | $1.39211/99.8$ |
| $r_{10} = -6.40$ | | |
| | $d_7 = 0.90$ | $1.62364/36.7$ |
| $r_{11} = -9.66$ | | |
| | $L_4 = 0.90$ | |
| $r_{12} = -6.98$ | | |
| | $d_8 = 0.90$ | $1.59551/39.2$ |
| $r_{13} = +5.05$ | | |
| | $L_5 = 1.70$ | |
| $r_{14} = -17.35$ | | |
| | $d_9 = 2.00$ | $1.62374/47.0$ |
| $r_{15} = -5.88$ | | |
| | $L_6 = \infty$ | |
| $f_e = +3.26904$ | | $\Sigma P = -0.01129$ |
| $A = 0.95$ | | $\Sigma \Gamma = -0.03695$ | wherein $f_e$=the focal length for the $e$-line,
$A$=the aperture,
$\Sigma P$=the Seidel coefficient for the Petzval sum,
$\Sigma \Gamma$=the Seidel coefficient for astigmatism,
$B_e$=the magnification for the $e$-line,
$r$=radius
$L_0$=distance of the object,
$L_b$=distance to the image,
$L$=distance between two lenses,
$d$=thickness of lens,
$n_d$=refractive index and Abbe number.

GOTTFRIED RAVIZZA.
KARL KEINER.
WALTER KLEIN.

References Cited in the file of this patent
UNITED STATES PATENTS

| Number | Name | Date |
|---|---|---|
| 1,578,259 | Boegehold | Mar. 30, 1926 |
| 1,761,441 | Foster | June 3, 1930 |
| 1,910,115 | Luboshez | May 23, 1933 |
| 2,050,024 | Sonnefeld | Aug. 4, 1936 |
| 2,206,155 | Boegehold | July 2, 1940 |